(12) United States Patent
Tineo

(10) Patent No.: US 11,144,877 B2
(45) Date of Patent: Oct. 12, 2021

(54) QUANTITY SENSING STORAGE SYSTEM

(71) Applicant: PAYPAL, INC., San Jose, CA (US)

(72) Inventor: Brandon Alexander Tineo, Antioch, CA (US)

(73) Assignee: PAYPAL, INC., San Jose, CA (US)

( * ) Notice: Subject to any disclaimer, the term of this patent is extended or adjusted under 35 U.S.C. 154(b) by 240 days.

(21) Appl. No.: 15/727,261

(22) Filed: Oct. 6, 2017

(65) Prior Publication Data
US 2019/0108483 A1    Apr. 11, 2019

(51) Int. Cl.
| | | |
|---|---|---|
| *G06Q 10/08* | (2012.01) | |
| *G06Q 50/28* | (2012.01) | |
| *G06Q 20/32* | (2012.01) | |
| *G06Q 10/04* | (2012.01) | |
| *G07G 1/00* | (2006.01) | |
| *G07F 9/02* | (2006.01) | |
| *G06Q 20/20* | (2012.01) | |
| *G07G 3/00* | (2006.01) | |

(52) U.S. Cl.
CPC ......... *G06Q 10/0875* (2013.01); *G06Q 10/04* (2013.01); *G06Q 20/203* (2013.01); *G06Q 20/208* (2013.01); *G06Q 20/32* (2013.01); *G06Q 50/28* (2013.01); *G07F 9/026* (2013.01); *G07G 1/0072* (2013.01); *G07G 3/00* (2013.01)

(58) Field of Classification Search
CPC .... G06Q 10/0875; G06Q 10/04; G06Q 20/32; G06Q 50/28
See application file for complete search history.

(56) References Cited

U.S. PATENT DOCUMENTS

| | | | | |
|---|---|---|---|---|
| 5,844,808 | A * | 12/1998 | Konsmo | G07F 5/18 700/244 |
| 7,240,027 | B2 * | 7/2007 | McConnell | G07G 3/003 705/28 |
| 7,844,509 | B2 * | 11/2010 | Bodin | G06Q 10/0875 705/29 |
| 9,741,034 | B1 * | 8/2017 | Criss | G06Q 20/12 |
| 2008/0004891 | A1 * | 1/2008 | Bostwick | G06Q 30/0603 705/1.1 |
| 2009/0281891 | A1 * | 11/2009 | Walker | G07F 9/002 705/14.38 |

(Continued)

*Primary Examiner* — Peter Ludwig
*Assistant Examiner* — Michael Jared Walker
(74) *Attorney, Agent, or Firm* — Haynes and Boone, LLP

(57) ABSTRACT

A quantity sensing storage device enables automatic ordering of a product using an ordering engine that monitors quantity signals generated by a quantity sensor that is configured to provide the quantity signals based on a quantity of a first set of a product stored at the quantity sensing storage device. Base on the quantity of the first set, the ordering engine determines whether an order threshold has been satisfied. The quantity sensing storage device automatically provides instructions to a service provider device via a wireless communication subsystem to order a second set of the product in response to determining that the order threshold has been satisfied. The ordering engine continuously updates the order threshold such that when the second set of the product is received by a user of the quantity sensing storage device, an optimal portion of the first set of the product remains stored in the storage enclosure.

20 Claims, 11 Drawing Sheets

(56) References Cited

U.S. PATENT DOCUMENTS

| | | | | |
|---|---|---|---|---|
| 2012/0327228 A1* | 12/2012 | Nomura | .................... | G08G 1/04 |
| | | | | 348/143 |
| 2013/0069985 A1* | 3/2013 | Wong | ...................... | G06F 1/163 |
| | | | | 345/633 |
| 2014/0129363 A1* | 5/2014 | Lorah | ................ | G06Q 30/0282 |
| | | | | 705/26.1 |
| 2014/0324621 A1* | 10/2014 | Harrison | ............ | G06Q 30/0605 |
| | | | | 705/26.4 |
| 2015/0142621 A1* | 5/2015 | Gray | ....................... | G07F 9/026 |
| | | | | 705/28 |
| 2016/0026853 A1* | 1/2016 | Wexler | .................... | G06F 3/005 |
| | | | | 382/103 |
| 2016/0048798 A1* | 2/2016 | Meyer | ................. | G01G 19/4144 |
| | | | | 705/28 |
| 2016/0070614 A1* | 3/2016 | Joshi | ..................... | G06F 3/0484 |
| | | | | 714/47.1 |
| 2016/0247113 A1* | 8/2016 | Rademaker | .... | G06Q 10/063114 |
| 2017/0032102 A1* | 2/2017 | Skoda | .................... | G16H 20/13 |
| 2017/0148002 A1* | 5/2017 | Stock | .................. | G06Q 20/326 |
| 2017/0148060 A1* | 5/2017 | Showers | ................ | H04W 4/02 |
| 2017/0227394 A1* | 8/2017 | Bhutani | ............... | B67D 1/0078 |

\* cited by examiner

QUANTITY SENSING STORAGE SYSTEM

BACKGROUND

The present disclosure generally relates to product storage systems and more particularly to a quantity sensing storage system.

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

In some situations, transactions for products and services may occur automatically with the payment service provider such as in subscription based ordering and delivery of products or services by a merchant. Subscription based ordering and delivery of products provides a convenience to consumers in that the consumer does not have to manually order the product. This is especially convenient for consumable products that need to be ordered frequently. However, for some consumers it is difficult to track when the consumer has to update their subscription if more or less of a product is needed for a given time period. Furthermore, the consumption of some products is more variable than others, which can cause a consumer to frequently run out of product, require the user to store a large quantity of the product for the time frame of the subscription to satisfy the consumer's needs, or the user may have excess product from a previous order which may lead to waste if the product expires or the user ends up with more product than needed.

Thus, Applicant recognizes that there is a need for an improved automatic product ordering system.

Figure 1A:
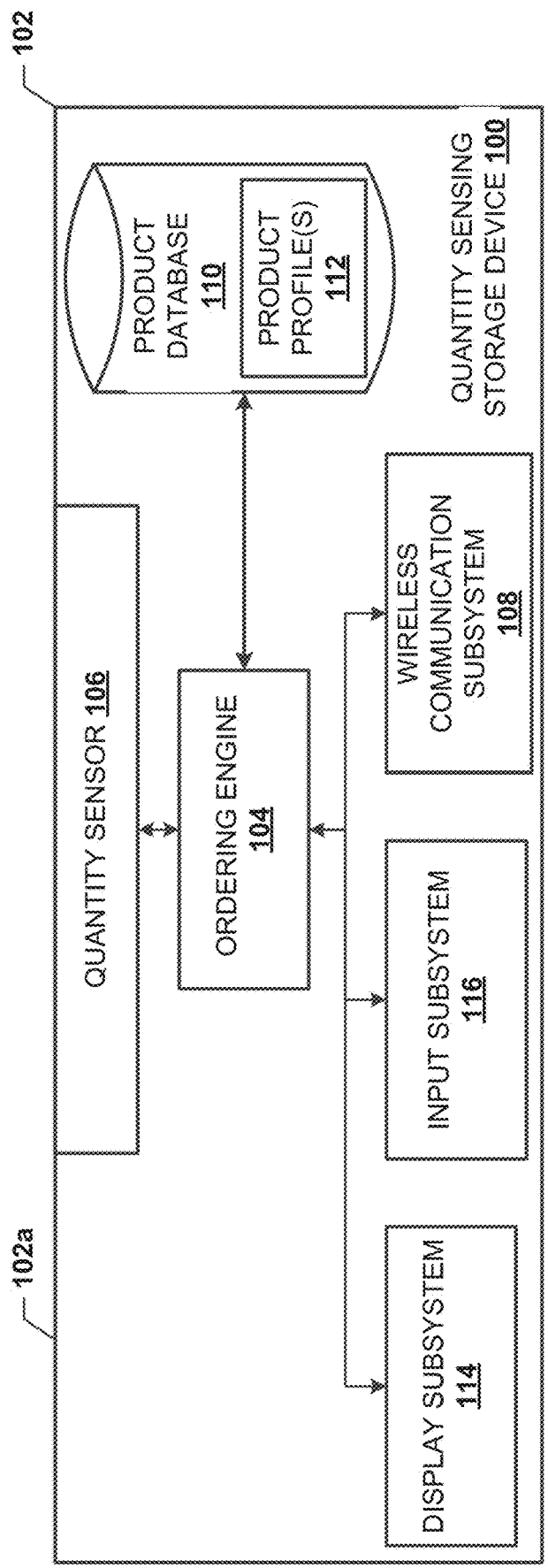
FIG. 1A is a schematic view illustrating an embodiment of a quantity sensing storage system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for automatically ordering a product by a quantity sensing storage device. For example, the quantity sensing storage device may monitor quantity of a product stored with the quantity sensing storage device. The quantity sensing storage device may include a quantity sensor that generates quantity signals based on the quantity of the product stored with the quantity sensing storage device. The quantity signals are processed by an ordering engine to determine quantity information which includes the quantity of the product stored. The quantity sensing storage device may monitor the rate at which the product is being depleted from the quantity sensing storage device based on the monitored quantity. The quantity sensing storage device or a service provider device of a service provider that supplies the product may use the quantity information and/or the rate of consumption to determine when to automatically order additional product based on an order threshold. Once the automatic order has been placed, the quantity sensing storage device and/or the service provider device may continue to monitor the quantity of the product stored with the quantity sensing storage device to determine whether the product stored with the quantity sensing device depletes or is likely to deplete, such as based on rate of use or consumption, before the additional product arrives or a quantity of the product that remains is excessive (e.g., above a number or over a weight associated with the product) when the additional product arrives. The ordering engine may update the order threshold based on the quantity of the product that remains at the quantity sensing storage device when the additional product arrives such that an optimal order threshold is determined such that the user has no more or no less than a predetermined quantity or weight range of the product at a given time to reduce waste, to have the product always available, and to prevent increased storage requirements for excess product.

Figure 1B:
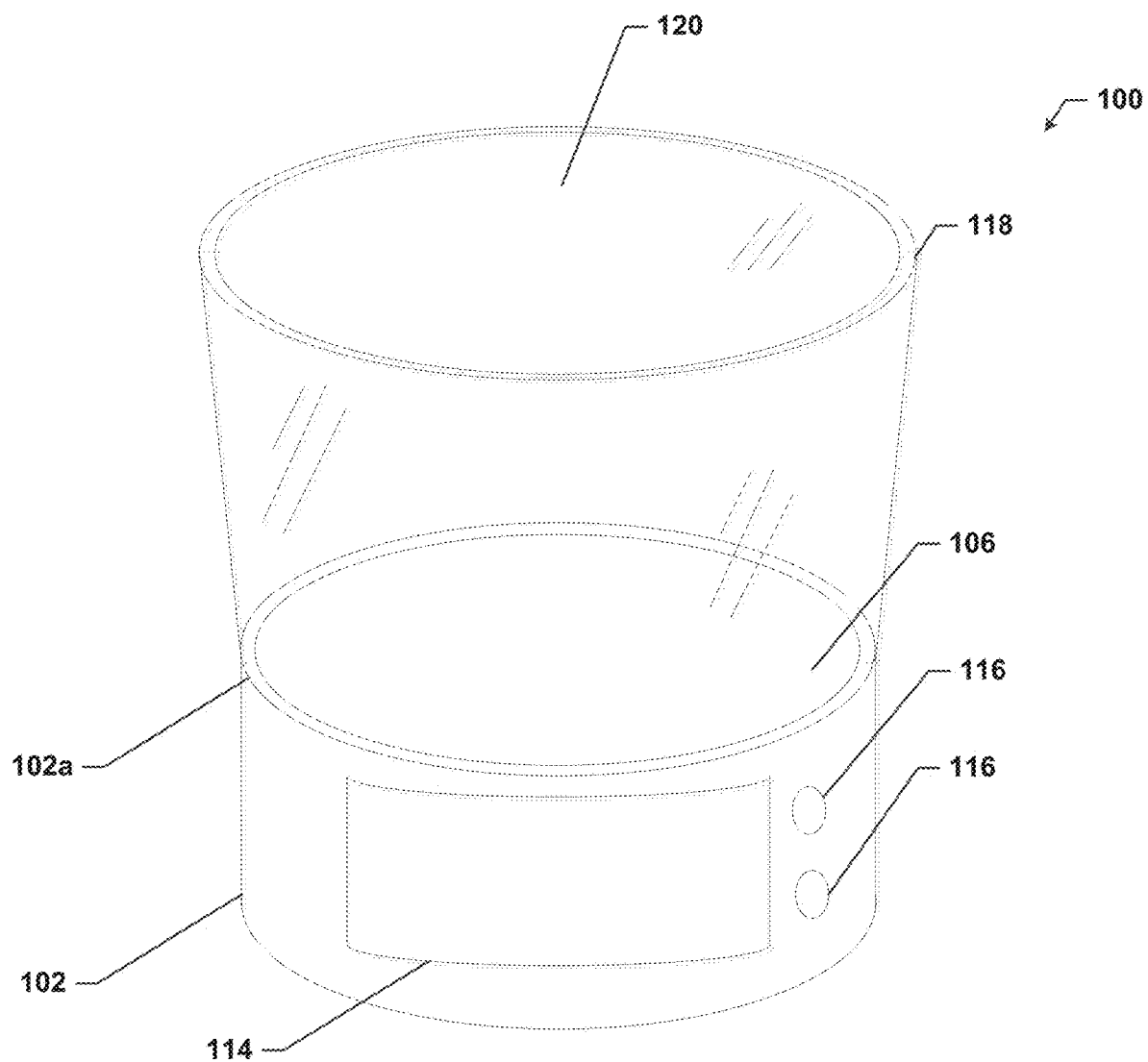
FIG. 1B is a perspective view illustrating an embodiment of a quantity sensing storage system that may be provided by the quantity sensing storage system of FIG. 1A.

Referring now to FIGS. 1A and 1B embodiments of a quantity sensing storage device 100 are illustrated, and may be provided to utilize a computer system 700 discussed below with reference to FIG. 7, or components of the computer system 700. As discussed below, FIG. 1B illustrates an embodiment of a quantity sensing storage device used in the examples described below, and one of skill in the art in possession of the present disclosure will appreciate that the quantity sensing devices described herein may utilize different subsets of the features illustrated for the quantity sensing storage devices 100 of FIG. 1A (e.g., the quantity sensing storage device illustrated in FIG. 1B includes a display subsystem and input subsystem, while in other embodiments the quantity sensing storage device does not include a display subsystem and input subsystem, and instead connects locally to a user computing device to enable display and input functionality). As such, a wide variety of modifications to the quantity sensing storage devices discussed below is envisioned as falling within the scope of the present disclosure.

With reference to the embodiment illustrated in FIG. 1A, the quantity sensing storage device 100 includes a chassis 102 that houses components of the quantity sensing storage device 100, only some of which are illustrated in FIG. 1A. For example, the chassis 102 may house a processing system (not illustrated, but which may be provided by a processor 704 discussed below with reference to FIG. 7) and a memory system (not illustrated, but which may be provided by a memory 706 discussed below with reference to FIG. 7) that includes instructions that, when executed by the processing system, cause the processing system to provide an ordering engine 104 that is configured to perform the functions of the ordering engines and quantity sensing storage devices discussed below.

The chassis 102 may also house a quantity sensor 106 that is coupled to the ordering engine 104 and that is accessible on at least a portion of an outer surface 102a of the chassis 102. The quantity sensor 106 may be accessible on at least a portion of the outer surface 102a of the chassis 102 such that the quantity sensor 106 can detect a quantity of a product or a quantity from a container and/or platform that holds the product. While the quantity sensor 106 may be accessible on a top surface of the chassis 102 as illustrated, the quantity sensor 106 may be also or alternatively located on a bottom surface or one of the side surfaces depending on the product the quantity sensing storage system is being used to store. In one example, the quantity sensor 106 may include a force sensor such as capacitive sensing device(s), force sensor(s) incorporating force sensing resistor(s), load cell(s) and/or displacement sensor(s) combined with springs or other resilient members to facilitate indirect measurements of force (e.g., linear variable transformers, optical encoders, and/or switches that close at threshold forces). While illustrated and described herein as a force sensor, one of skill in the art in possession of the present disclosure will recognize that any type of quantity sensor (e.g., level sensor(s) for measuring the level of liquids and fluidized solids, presence sensors utilizing, for example, machine vision, an electromechanical counter that may count the addition and/or removal of a product, and/or any other quantity sensor that that may be included in the chassis 102 in place of or in addition to the force sensor) may fall within the scope of the present disclosure. Note that the quantity sensor 106 may also or alternatively measure a weight, which can be achieved through conventional weight sensors or scales.

The chassis 102 may also house a wireless communication subsystem 108 that is coupled to the ordering engine 104. In an embodiment, the wireless communication subsystem 108 may include a variety of local and/or peer-to-peer wireless communication devices such as, for example, a BLUETOOTH® wireless communication device, a Near Field Communication (NFC) device, and/or other local/peer-to-peer wireless communication components that would be apparent to one of skill in the art in possession of the present disclosure. In addition, the wireless communication subsystem 108 may include a variety of Internet wireless communication devices such as, for example, a WiFi wireless communication device, a cellular communication device, and/or other Internet wireless communication components that would be apparent to one of skill in the art in possession of the present disclosure.

The chassis 102 may also house a storage device (not illustrated, but which may be a storage device 708 discussed below with reference to FIG. 7) that provides a product database 110 that is configured to store one or more product profiles 112 associated with the product being stored with the quantity sensing storage device 100. For example, the product profiles 112 may include quantity information, threshold information, rate of use information, user preferences, payment information, time and date information, ordering information, as well as other data utilized by components (e.g., the ordering engine 104) in the quantity sensing storage device 100 that may be stored in the product database 110.

The chassis 102 may also house each of a display subsystem 114 and an input subsystem 116 that are coupled to the ordering engine 104. In an embodiment, the display subsystem 114 may include a Light Emitting Device (LED) display and/or a variety of display devices that would be apparent to one of skill in the art in possession of the present disclosure, and the input subsystem 116 may include physical buttons, voice recognition subsystems, and/or a variety of input devices that would be apparent to one of skill in the art in possession of the present disclosure. In addition, the display subsystem 114 and the input subsystem 116 may be combined via, for example, a touch input display device. While a specific quantity sensor storage device 100 has been described, as illustrated and discussed below with reference to FIG. 1B, quantity sensor storage devices may utilizes different subsets of the components illustrated in FIG. 100 to provide a variety of functionality to enable the automatic ordering discussed below while remaining within the scope of the present disclosure.

With reference to FIG. 1B, an example of the quantity sensing storage device 100 is illustrated. The quantity sensing storage device 100 includes the chassis 102 cylindrically dimensioned with the display subsystem 114 viewable on a surface of the chassis 102, and the input subsystem 116 provided as input buttons. The quantity sensor 106 is accessible on an outer surface 102a of the chassis 102 and includes a force sensor that includes a load cell. In the illustrated embodiment, a storage enclosure 118 is coupled to the outer surface 102a of the chassis 102 and defines an opening 120 such that products may be stored therein and provides access to the quantity sensor 106. While a specific example of the quantity sensing storage device 100 is illustrated in FIG. 1B, one of skill in the art in possession of the present disclosure will recognize that the quantity sensing storage device 100 may be provided in a variety of forms (e.g., configured to receive a storage enclosure (e.g., a shelf, a basket, a jar, a box, a bottle, a tank, a plate etc.) on the quantity sensor 106, be incorporated into storage enclosures configured for specific or generic products, a be of any shape and/or size, and other forms) while remaining within the scope of the present disclosure.

Figure 2:
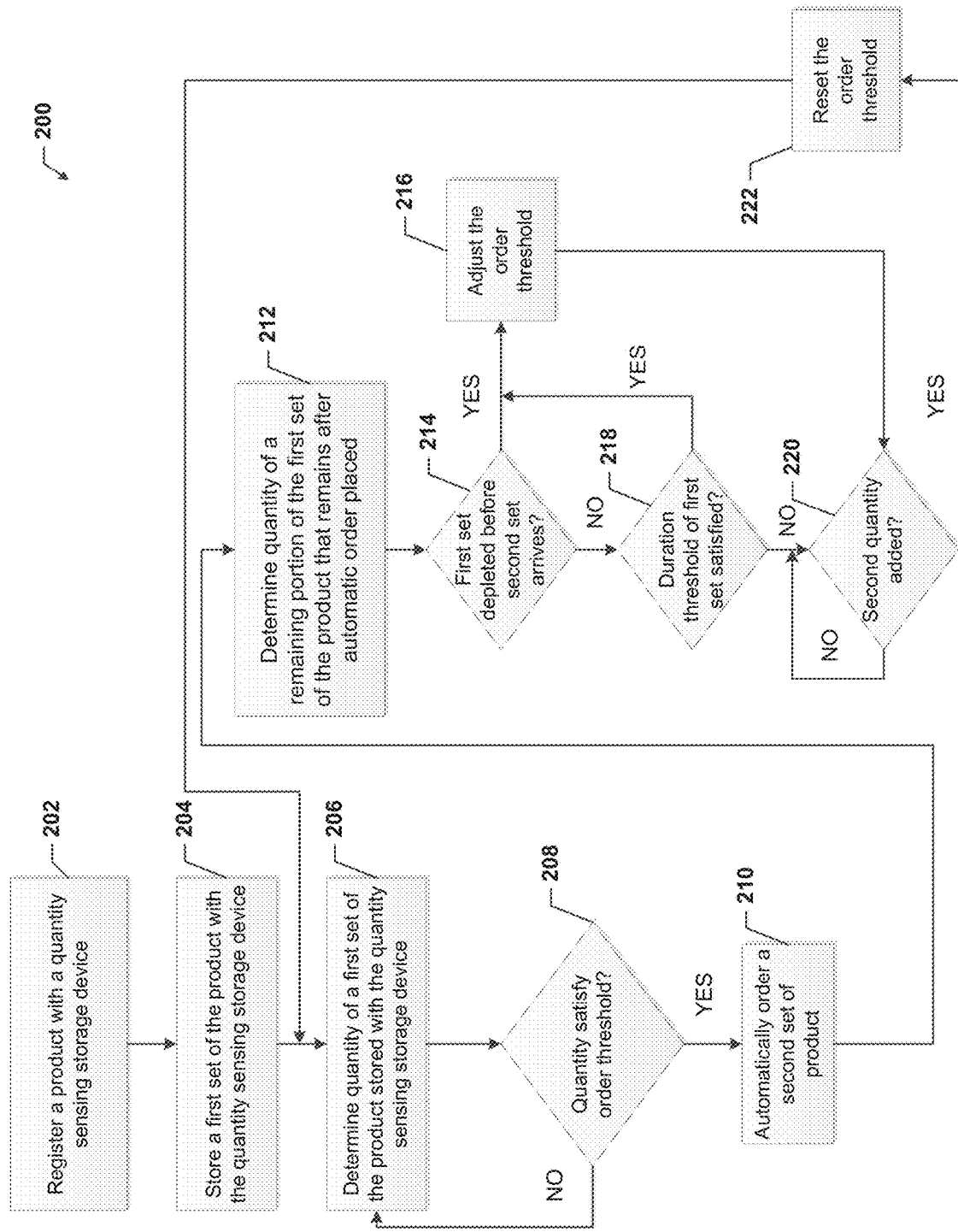
FIG. 2 is a flow chart illustrating an embodiment of a method for automatically ordering a product.

Referring now to FIG. 2, embodiments of a method 200 for ordering a product is illustrated. As described below, method 200 provides a process for automatically ordering a product with a quantity sensing storage device. A user of the quantity sensing storage device may register the quantity sensing storage device with a service provider device to be associated with a product and a user account. The quantity sensing storage device monitors the consumption of the product when stored with the quantity sensing storage device and provides quantity information and/or instruction to a service provider device such that when a quantity of the product stored with the quantity sensing storage device reaches an order threshold, the service provider device may automatically complete an order for the product that is registered with the quantity sensing storage device. The service provider device may complete the order using a payment account provided by a payment services provider and associated with a user account provided by the service provider device and cause the order of the product to be shipped to the user of the quantity sensing storage device. The quantity sensing storage device may then monitor the product that remains stored with the quantity sensing storage device while the order is being shipped to the user to determine whether the order threshold needs to be adjusted. In examples where the service provider device is subscription based and orders for a product are sent at a fixed frequency, the quantity information captured by the quantity sensing storage device before and while orders are processed may be used to adjust the quantity of the product being ordered at each subscription interval.

In an embodiment, a payment service provider such as, for example, PayPal, Inc. of San Jose, Calif., United States, may operate to provide payment accounts, payment applications, payment services, and/or other payment service provider functionality that would be apparent to one of skill in the art in possession of the present disclosure. For example, the payment service provider may include a payment service provider system (e.g., a plurality of server devices and/or other computing components) that allows users to register for payment accounts and link financial accounts to allow funds to be transferred to and from the those payment accounts, download payment applications that enable the users to access, manage, and/or otherwise utilize those payment accounts, and/or enable a variety of other payment service functionality. As such, prior to the method 200, a service provider device may have obtained a payee payment account, downloaded a payee payment application, and/or performed other steps that enable the functionality discussed below. Similarly, prior to the method 200, a user of the quantity sensing storage device may have obtained a payer payment account, downloaded a payee payment application, and/or performed other steps that enable the functionality discussed.

Figure 3:
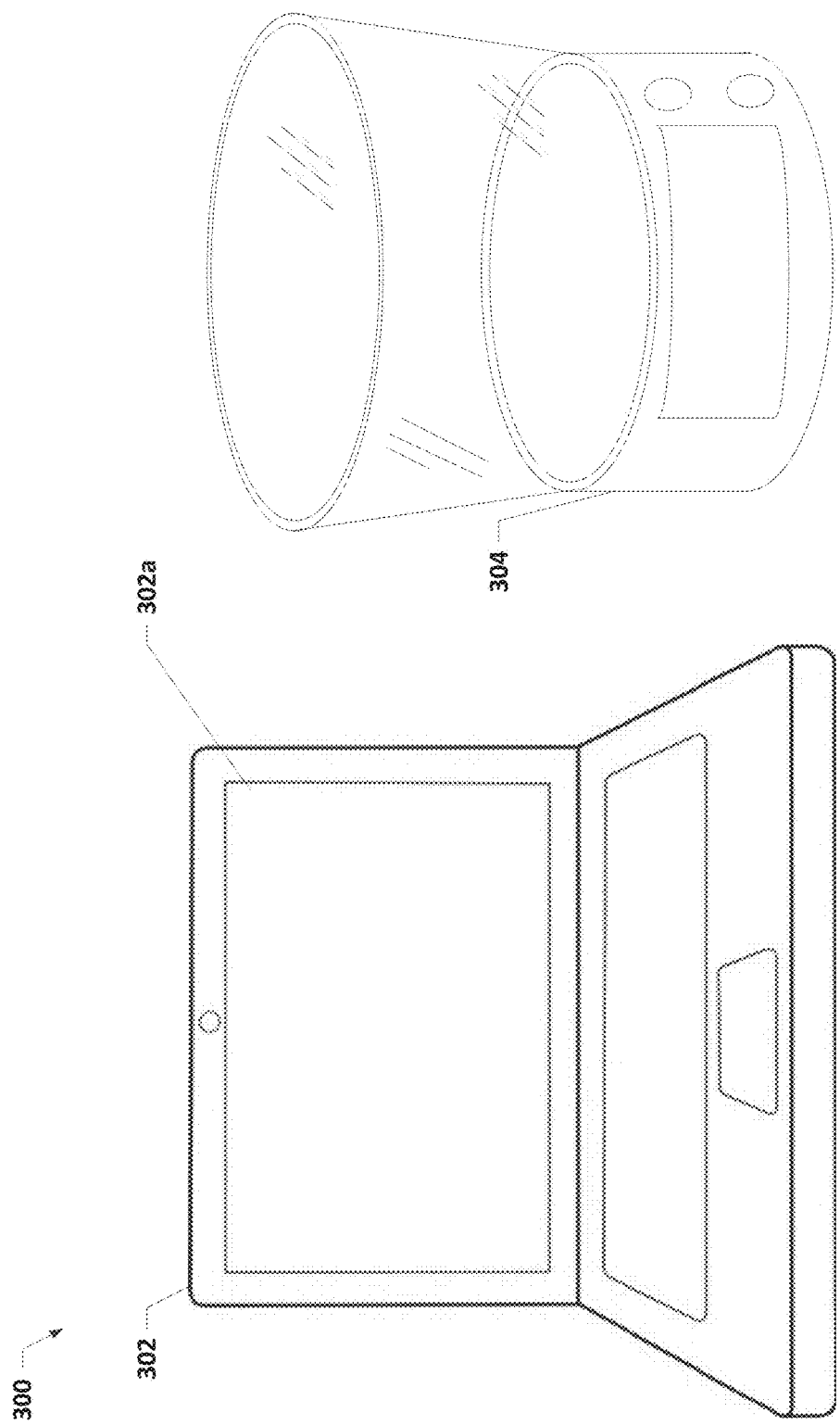
FIG. 3 is a perspective view illustrating an embodiment of a user computing device operating with the quantity sensing storage system of FIG. 1B.

The method 200 begins at block 202 where a user registers a quantity sensing storage device with a service provider system. With reference to FIG. 3, an embodiment of an automatic ordering system 300 including a user computing device 302 and a quantity sensing storage device 304 are illustrated. In the example discussed below, the user computing device 302 is illustrated as a laptop/notebook computing device having a display device 302a, and may include a variety of other laptop/notebook computing components that would be apparent to one of skill in the art in possession of the present disclosure. However, one of skill in the art in possession of the present disclosure will recognize that other types of computing devices may be provided in place of the laptop computing device illustrated in FIG. 3 while remaining within the scope of the present disclosure. The automatic ordering system 300 also includes the quantity sensing storage device 304 that may be substantially similar to the quantity sensing storage device 100 illustrated in FIGS. 1A and 1B. In some embodiments, the functionality of the user computing device 302 and the quantity sensing storage device 304 may be combined. However, the embodiment of the automatic ordering system 300 is provided to illustrate how the quantity sensing storage device 304 may be provided as a simplified peripheral component for any user with a computing device in order to enable the automatic ordering described herein.

At block 202, the user may utilize a service provider application (described above) running on the user computing device 302 or accessible through an Internet browser to register the quantity sensing storage device 304 with a user account with the service provider and that may be associated with a user payment account with a payment service provider. As discussed above, the user may have a user account provided by the service provider, and may have downloaded a service provider application from a service provider device to the user computing device 302. At block 202, the user may utilize a communication system in the user computing device 302 to communicate with the quantity sensing storage device 304 (e.g., via its wireless communication subsystem 108) to enable the service provider application to register the quantity sensing storage device 304. For example, the user computing device 302 may communicate with the quantity sensing storage device 304 at block 202 via a local/peer-to-peer wireless connection (e.g., BLUETOOTH®, NFC, etc.), via an Internet wireless connection (e.g., WiFi), via a wired connection (e.g., a USB cable connected to each of the user computing device 302 and the quantity sensing storage device 304), and/or in a variety of other manners that would be apparent to one of skill in the art in possession of the present disclosure.

In an embodiment, the ordering engine 104 and/or the wireless communication subsystem 108 in the quantity sensing storage device 304 includes a unique identifier that may be associated with the quantity sensing storage device 304, and at block 202 the service provider application on the user computing device 302 may retrieve that unique identifier and provide it via an Internet connection to the service provider for association with the user account. In another embodiment, the user account may include a unique identifier, and at block 202 the service provider application on the user computing device 302 may retrieve that unique identifier and provide to the quantity sensing storage device 304 for storage in the product database 110 (e.g., in a product profile 112). In some embodiments, the registration of the quantity sensing storage device 304 includes associating a product with the quantity sensing storage device 304 and providing any product thresholds, product conditions, instructions based on the product, and any other product information and instructions known in the art and storing those product instructions and product information in a product profile 112. However, while specific examples of the registration of quantity sensing storage device 304 with the user account have been described, one of skill in the art in possession of the present disclosure will recognize that quantity sensing storage devices 304 may be registered with user accounts in a variety of manners that will fall within the scope of the present disclosure.

Following block 202 of the method 200, the quantity sensing storage device 304 is registered with a user account. The registration of the quantity sensing storage device 304 with the user account may be followed by the quantity sensing storage device 304 retrieving and storing a variety of information. In an embodiment, subsequent to block 202, the quantity sensing storage device 304 may operate to connect to the service provider device via the Internet, retrieve a subscription information about the product, shipping information, back order information, user preferences, dates at which the product expires, order history of the product, quantity of the product, and store that product information and user information. For example, the ordering engine 104 on the quantity sensing storage device 304 may utilize the wireless communication subsystem 108 to connect to the service provider system via the Internet, retrieve the product information and the user information in the user account, and store the product information and the user information in a product profile 112 in the product database 110 on the quantity sensing storage device 304. While a few specific examples of information retrieved by the quantity sensing storage device 304 subsequent to the registration performed at block 202 has been described, one of skill in the art in possession of the present disclosure will recognize that the quantity sensing storage device 304 may retrieve and store other information and/or a variety of other information that may be utilized to provide the functionality discussed below while remaining within the scope of the present disclosure as well.

Figure 4A:
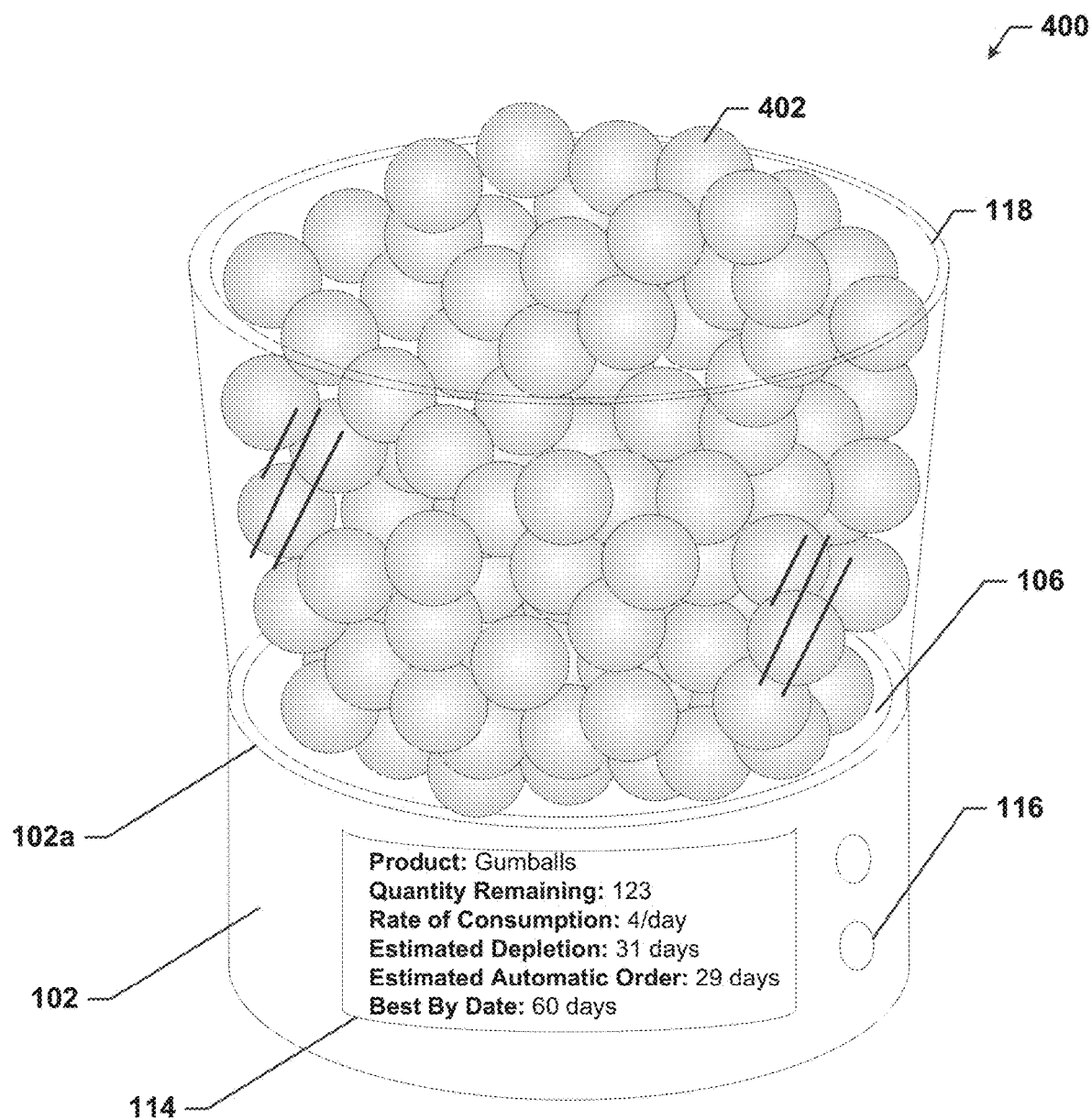
FIG. 4A is a perspective view illustrating an embodiment of the quantity sensing storage system of FIG. 1B performing a portion of an automatic order.

Referring back to FIG. 2, the method 200 may then proceed to block 204 where the user stores a first set of the product at the pressure sensing storage device. Referring to FIG. 4A, the quantity sensing storage device may store a product 402 with the quantity sensing storage device 304. The product 402 may be any perishable or non-perishable item. For example, the product may be toilet paper, coffee, juice, towels, diapers, milk, butter, bread, paper towels, water, fruit, candy, beans, oil, golf balls, clothing, nails, screws, and any other perishable or non-perishable item apparent to one of skill in the art in possession of the present disclosure. For example, the product 402 may be a package of gumballs that the user ordered from the service provider or purchased from a third party and registered the product 402 with the service provider system such that the service provider system may order additional quantities of the same product or a comparable product to that of the product 402 when an order threshold has been satisfied as discussed below. The package may be described as a set of the product which may include a plurality of individual products. In embodiments where the quantity sensing storage device 304 includes a display screen 114, the display screen 114 may display information about the set of the product that is stored in the quantity sensing storage device 304. For example, the display information may include an estimated data of depletion, a date of expiration, a remaining quantity of the product stored with the quantity sensing storage device, estimated order date, and/or any other product information, user information and/or service provider information apparent to one of skill in the art in possession of the present disclosure.

The method 200 then proceeds to block 206 where the quantity sensing storage device captures quantity information of the set of the product. In an embodiment at block 206, the quantity sensing storage device 100 captures quantity information via the quantity sensor 106. The quantity sensor 106 may include a load cell that generates an electrical signal whose magnitude is directly proportional to the force being measured. The electrical signal may be provided to the ordering engine 104. The ordering engine 104 may process the electrical signal to determine quantity information such as, for example, a weight of the set of the product, a quantity of individual products of the set based on a known weight per product that may be stored in the product profile 112, a rate at which the set of the product is being added or removed, and/or other quantity information apparent to one of skill in the art in possession of the present disclosure. Similarly, the quantity sensor 106 may include a level sensor that generates a quantity signal from which the ordering engine 104 may determine quantity information that includes a level of the product in the storage enclosure 118. In another example, the quantity sensor 106 may include a counter that generates quantity information based on a count of the product that entered the storage enclosure 118 and that is leaving the storage enclosure 118.

The ordering engine 104 may capture the quantity information and store it in the product profile 112 in the product database 110 and/or may provide the quantity information to a service provider device. When stored in the product profile 112 and/or provided to the service provider device, the quantity information may be associated with time information that includes the time at which the quantity information was generated and/or captured. While a few examples, of quantity sensors 106 that generate quantity information have been described, one of skill in the art in possession of the present disclosure will recognize other quantity sensors may generate quantity information and fall under the scope of the present disclosure.

The method 200 then proceeds to block 208 where a determination is made as to whether an order threshold has been satisfied. In an embodiment at block 208, the ordering engine 104 and/or an ordering engine included on a service provider device may determine, based on the quantity information captured at block 206 of method 200, whether an order threshold has been satisfied. The order threshold may be a dynamic threshold that adjusts based on order conditions such as rate of consumption of the product, order processing and shipping times, anticipated needs (e.g., the user going on vacation or the user hosting a dinner party, as examples of two extremes), size or available space of the storage enclosure, and other conditions. The order threshold, when satisfied, may indicate when more of the product being stored in the quantity sensing storage device 100 needs to be ordered. For example, when the quantity sensing storage device 100 and the product are first registered with the service provider device, the user may provide a predetermined quantity as the order threshold. Referring to the example illustrated in FIG. 4A, the user may estimate that the user's consumption of gumballs will be four gumballs per day and the user may know that the typical processing and shipping of the gumballs is two days. Therefore, the user may set the order threshold to eight gumballs so that the user does not run out of gumballs before a second set of gumballs arrives at the user's location.

Figure 4B:
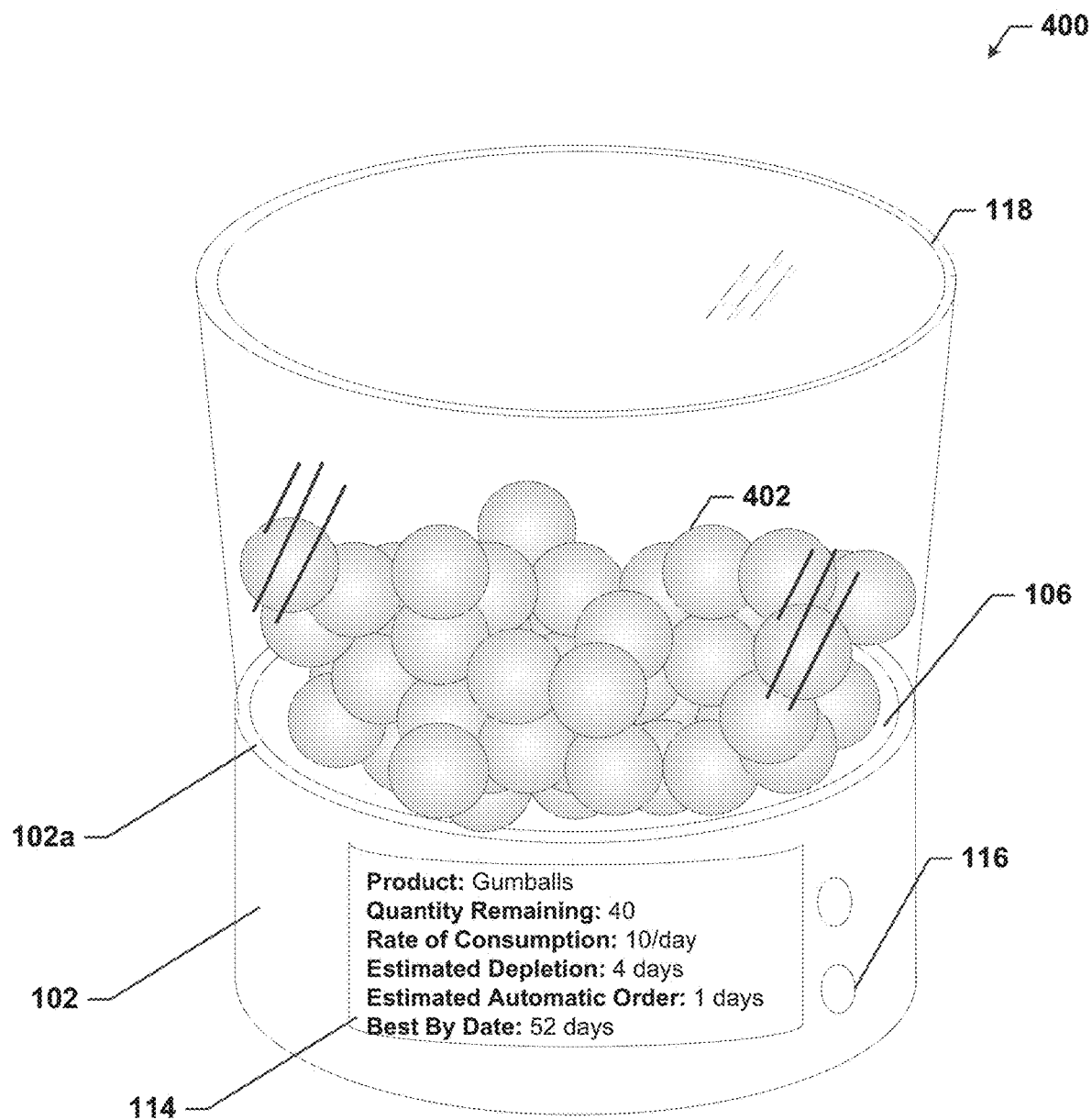
FIG. 4B is a perspective view illustrating an embodiment of the quantity sensing storage system of FIG. 1B performing a portion of the automatic order.

However, if the order threshold is set as dynamic, as the user is using the quantity sensing storage device 100, the quantity sensing storage device 100 may determine based on the quantity information being captured that the order threshold should be adjusted. Referring to FIG. 4B, the user may be consuming the gumballs at a rate of ten gumballs per day and there are only forty gumballs left. A delivery provider device and/or the service provider device may be providing ordering information to the quantity sensing storage device such as an estimated time to deliver the product 402 is three days. Therefore, if the original order threshold were to remain, the user would deplete the gumballs stored with the quantity sensing storage device 100 before the second set of the gumballs arrived. The ordering engine 104 may determine a second order threshold (e.g., thirty gumballs) based on the estimated shipping time and the rate of consumption of the gumballs.

In another example, where the service provider provides the product to the user on a subscription basis, the order threshold may include a time component when the service provider device requires an adjustment to the quantity and/or an adjustment to the intervals between orders in addition to a quantity component. In this example, if a quantity of the set of the product that remains at a time threshold falls outside of satisfies a range defined by an upper quantity threshold and a lower quantity threshold (e.g., too much product or not enough product, respectively), then the ordering engine 104 and/or the service provider device may adjust the quantity of the product being ordered as discussed in further detail below. If the quantity does not satisfy the order threshold, then the method 200 resumes with monitoring and capturing the load provided by the first set of the product at block 206.

If the order threshold has been satisfied, the method 200 then proceeds to block 210 where an automatic order for a second set of the product is made. In an embodiment at block 210, the quantity sensing storage device 100 may provide instructions via the wireless communication subsystem 108 to the service provider device that causes the service provider device to process an order for a second set of the product. Alternatively, the quantity sensing storage device 100 may provide the quantity information including the quantity sensing storage device identifier to the service provider device that causes the service provider device to determine that the order threshold has been satisfied for that quantity sensing storage device and automatically process an order for a second set of the product. The order of the product may be a second set of the product and may include a predetermined quantity identified in the user's profile. For example, the second set of the product may include a quantity that the storage enclosure 118 may contain such that the user does not have to store additional product besides what fits in the storage enclosure 118. However, in other examples such as in subscription based service provider systems, the quantity of the second set may include a quantity that should sustain the user over the duration of the subscription interval.

In another example, the display screen 114 may display order information to the user before the automatic order is made such that the user may adjust the order of the second set of the product if needed using the input subsystem 116. For example, the user may know ahead of time that the user will be out of town for a week, and thus requiring less of the product, or the user will have a party soon, and thus requiring more of the product. However, if the user does not provide an input, the order may be processed automatically by the service provider device. The service provider device may charge the user payment account include in the user profile and provided by the payment service provider to complete the order. The service provider system may process the order and ship the order to the user based on the specific service provider (e.g., package and deliver, dispatch a service, etc.).

Figure 4C:
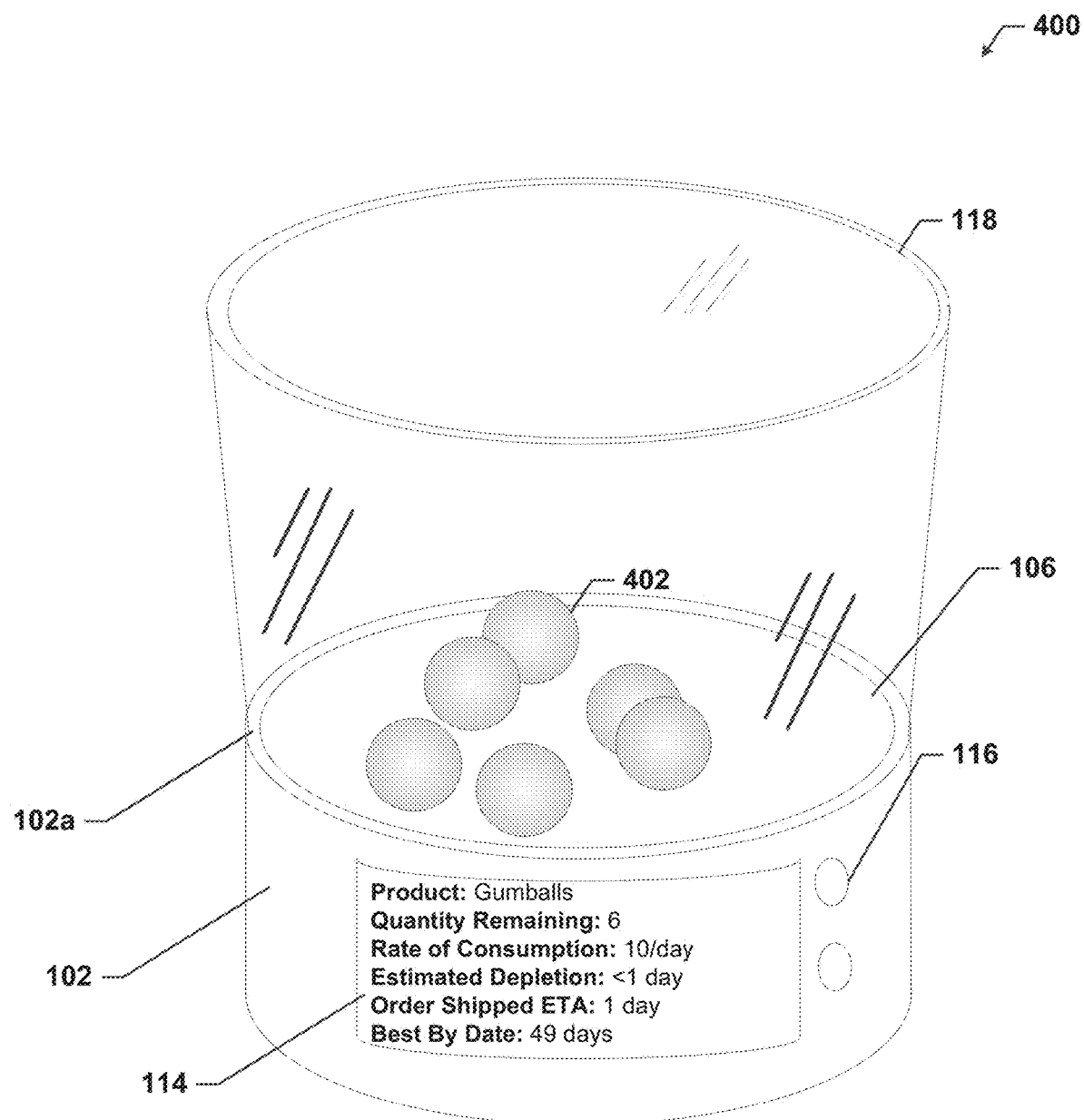
FIG. 4C is a perspective view illustrating an embodiment of the quantity sensing storage system of FIG. 1B performing a portion of the automatic order after the automatic order has been made.

The method 200 may then proceed to block 212 where the quantity sensing storage device captures a quantity provided by a first portion of the first set of the product that remains stored with the quantity sensing storage device. Referring to FIG. 4C, after the order has been shipped, the quantity sensing storage device 100 may continue to monitor the quantity of the product 402 (e.g., gumballs) remaining in the storage enclosure 118. The quantity sensing storage device 100 captures quantity information via the quantity sensor 106 as described at block 206. In the illustrated example in FIG. 4C, the quantity sensor 106 may provide a quantity signal based on the quantity of gumballs remaining in the storage enclosure 118 to the ordering engine 104 from which the ordering engine 104 may determine quantity information that the ordering engine 104 may store in the product profile 112 and/or provide to the service provider device.

Figure 4D:
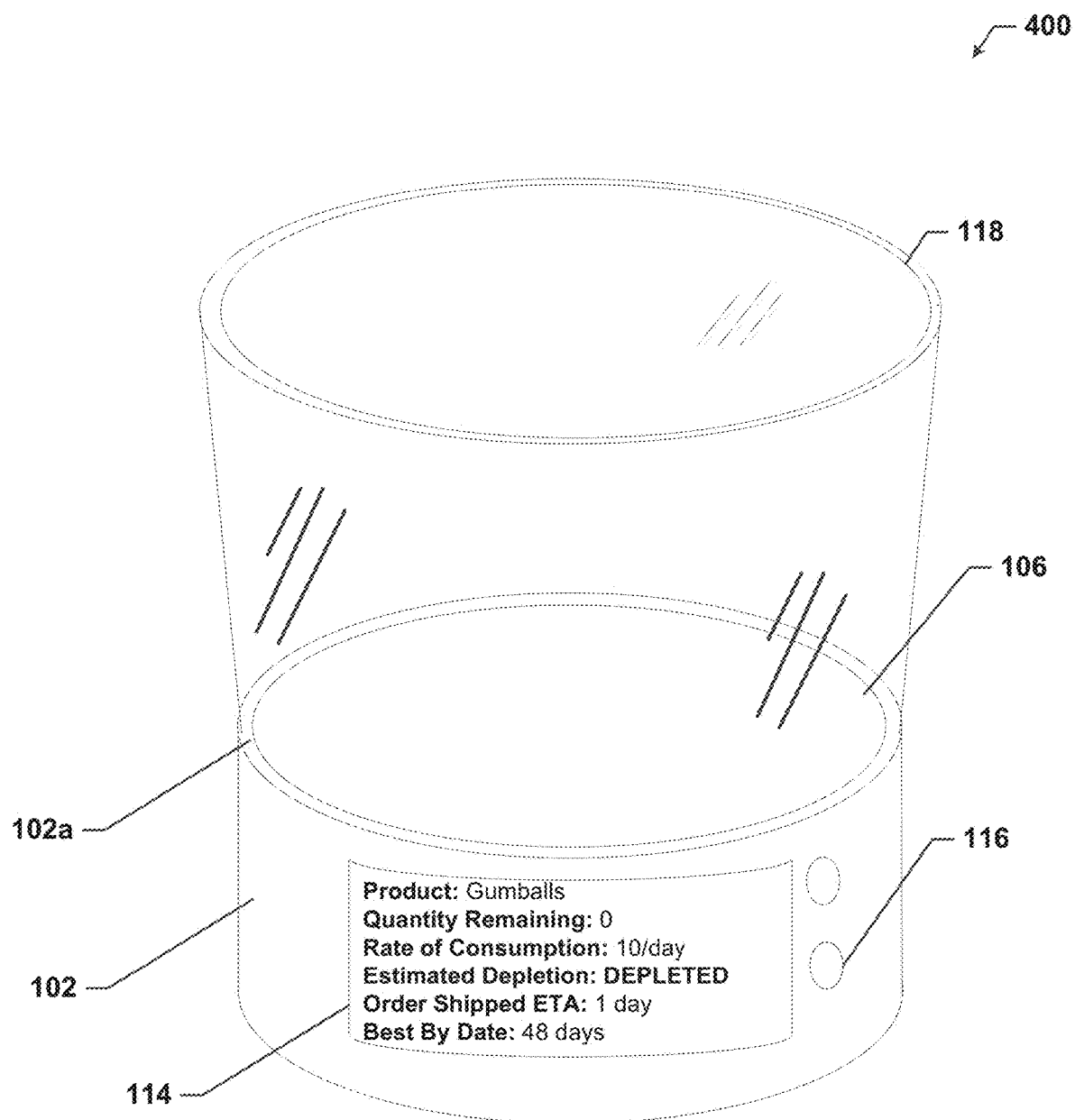
FIG. 4D is a perspective view illustrating an embodiment of the quantity sensing storage system of FIG. 1B performing a portion of the automatic order after the automatic order has been made.

The method 200 then proceeds to block 214 where it is determined whether the remaining portion of the first set of the product depletes before the second set of the product is delivered to the user. In an embodiment at block 214, the ordering engine 104 may continue to monitor the quantity of the product 402 via the quantity sensor 106 and store the quantity information in the product profile 112 and/or provide the quantity information to the service provider system. Tracking information of the second set of the product may be provided to the service provider and/or the quantity sensing storage device 100 from a third party shipping provider and/or the service provider's own delivery tracking system. Referring to FIG. 4D, the product 402 included in the remaining portion of the first set of the product may deplete before the second set of the product arrives at the user's location and notify the user through the display screen 114 that the product has depleted and the second set of the product should arrive in one day. In an embodiment, the product 402 may deplete when a predetermined depletion threshold has been satisfied, which may include some quantity of the remaining portion of the product and not necessarily a complete depletion of no product being stored with the quantity sensing storage device 100.

If it is determined that the remaining portion of the first set of the product is depleted at block 214, then the method 200 proceeds to block 216 where the order threshold is adjusted. In an embodiment at block 216 and referring to FIG. 4D, the display screen 114 may provide an output requesting input from the user as to whether the user wants to adjust the order threshold, and the user may provide inputs through the input subsystem 116 to adjust the order threshold or decline making any adjustments. In another example, the ordering engine 104 included on the quantity sensing storage device 100 and/or included on the service provider device may determine a new order threshold in response to the depletion by either increasing the number of days to allow the product to be shipped and/or adjusting the quantity of the product provided in subsequent sets of the product that is ordered in the case of a subscription based service that has fixed intervals of when the product can be ordered. For example, referring to FIG. 4D, the product 402 ran out with one day remaining until the second set of the product arrived at the user location. The ordering engine 104 may adjust the order threshold to an earlier day and/or adjust the quantity of the product in a subsequent set.

The method 200 may then proceed to block 220 where it is determined whether the second set has been stored with the quantity sensing storage device. In an embodiment at block 220, the ordering engine 104 may determine whether the second set of the product is added to the storage enclosure 118. For example, the quantity sensor 106 may provide quantity signals to the ordering engine 104 from which the ordering engine 104 may determine that a refill threshold has been satisfied that indicates that the second set of the product has been added to the storage enclosure. In various examples, the user may add a leftover portion of the first set of the product to the storage enclosure 118, which the ordering engine 104 may detect as the remaining portion of the first set based on the quantity in the first set of the product when ordered, the quantity of the first set of the product that was initially stored in the storage enclosure 118, and the quantity that has been removed from the storage enclosure 118. However, in some situations the user may have used that portion of the first set of the product that was not stored in the storage enclosure 118 without actually storing that portion in the storage enclosure 118. Therefore, the ordering engine 104 may monitor for a quantity that is added to the storage enclosure 118 that exceeds a predetermined refill threshold that is greater than any remaining portion of the first set that has not been stored in the storage enclosure 118 after the second set of the product has been shipped and received by the user.

If in block 220 it is determined that the second quantity is added, then the method 200 may proceed to block 222, where the order threshold is reset such that the quantity sensing storage system monitors for the order threshold and/or an adjusted order threshold. Once the order threshold is satisfied at block 208, the ordering engine 104 may cease monitoring for that order threshold such that additional instructions to order the product are not provided to the service provider device until the second set of the product arrives at the user location and the refill threshold has been satisfied. This timeout prevents additional orders from being sent to the user while the second set of the product is being delivered and/or being stored in a shipping container at the user's location. The method 200 then returns to block 206, where the ordering engine 104 monitors the quantity of the second set of the product.

Referring back to block 214 of method 200, if it is determined that the remaining portion of the first set of the product is not depleted at block 214, then the method 200 proceeds to block 218 where it is determined whether the remaining portion of the first set of the product remains stored in the quantity sensing storage device for a duration that satisfies a duration threshold. Referring to FIG. 4C, the remaining portion of the first set of the product 402 may remain in the storage enclosure 118 when the second set of is delivered to the user location. The duration threshold may be based on the quantity of the remaining portion of the first set that remains when the second set is delivered and/or the time that the quantity of the remaining portion of the first set remains after the delivery of the second set of the product. The duration threshold may be used to prevent too much of the product being ordered and prevent wasting the product due to spoilage such that the duration threshold may be based on the best by date indicated on the display screen 114 illustrated in FIGS. 4A-4D.

If it is determined that the remaining portion of the first set of the product remains stored in the quantity sensing storage device for a duration that satisfies the duration threshold, the method 200 may proceed to block 216 where the order threshold is adjusted according to the quantity information. For example, the order threshold may be lowered by the quantity of product that remains in the quantity sensing storage device 304 when the duration threshold is satisfied. In another example, the date that the ordering engine 104 provides instructions to the service provider device to process the order may be adjusted to compensate for the additional product that the user may have. The method 200 then may proceed to the block 220 as described above following adjusting the order threshold in block 216 or in response to the remaining portion of the first set of the product stored in the quantity sensing storage device for a duration that does not satisfies a duration threshold in block 218. Therefore, the order threshold may be updated before the order is placed, after the order for the second set of the product is placed but before the second set of the product has been arrived at the user location, after the second set of the product has arrived at the user location but before the second set of the product has been added to the quantity sensing storage device 100, and/or after the second set of the product has been added to the quantity sensing storage device 100 and/or a portion of the first set of the product remains stored in the quantity sensing storage device.

In various embodiments, the ordering engine 104 be configured with one or more machine learning algorithms to perform supervised machine learning, unsupervised machine learning (e.g., deep belief networks, neural networks, statistical pattern recognition, rule-based artificial intelligence, etc.) semi-supervised learning, reinforcement learning, deep learning, and other machine learning algorithms when updating, creating, and/or reinforcing a product profile for determining any of the thresholds (e.g., the order threshold, the duration threshold, the refill threshold, etc.) discussed herein.

Note that although the above description has been primarily directed to "quantities," the sensor can also or alternatively be a weight sensor that determines a weight or remaining weight of a product within the container and provides a signal to indicate whether new product is needed, based on the various factors discussed above. For example, if the product is flour, a rate of use or remaining weight may meet a threshold that indicates more flour should be ordered.

In other embodiments, the product database stored on the device described above may be located remote from the device. For example, the device may periodically or at other intervals, such as when the product within the container/device reaches a threshold weight or number or when a rate of exhaustion or consumption of the product reaches a threshold rate, a signal may be sent to a service provider, who then processes the signal to determine whether an order is needed. For example, the service provider may access the product database stored within the service provider system and associated with an account of the user to determine and place an order. In this way, the quantity sensing storage device can be less costly to consumers, resulting in more use or sale of the device.

Thus, systems and methods have been described that provide for sensing quantity of a product stored in a quantity sensing storage device, automatically order the product once an order threshold has been satisfied, and adjusting that order threshold based on conditions within the system. The quantity sensing storage device may be configured such that the quantity sensing storage device causes a service provider to automatically order a product that is registered with the quantity sensing storage device. The quantity sensing storage device may automatically adjust the quantity of the product that is reordered and/or the date that the product is reordered based on the quantity information captured by the quantity sensing storage device that indicates information about the user's consumption of the product and other conditions such as product availability and/or shipping information. As such, the quantity sensing storage device may provide the product to the user before the user runs out of the product or shortly after the user runs out of the product so that the user has a continual supply without having track quantity of the product and to place the order for the product themselves.

Figure 5:
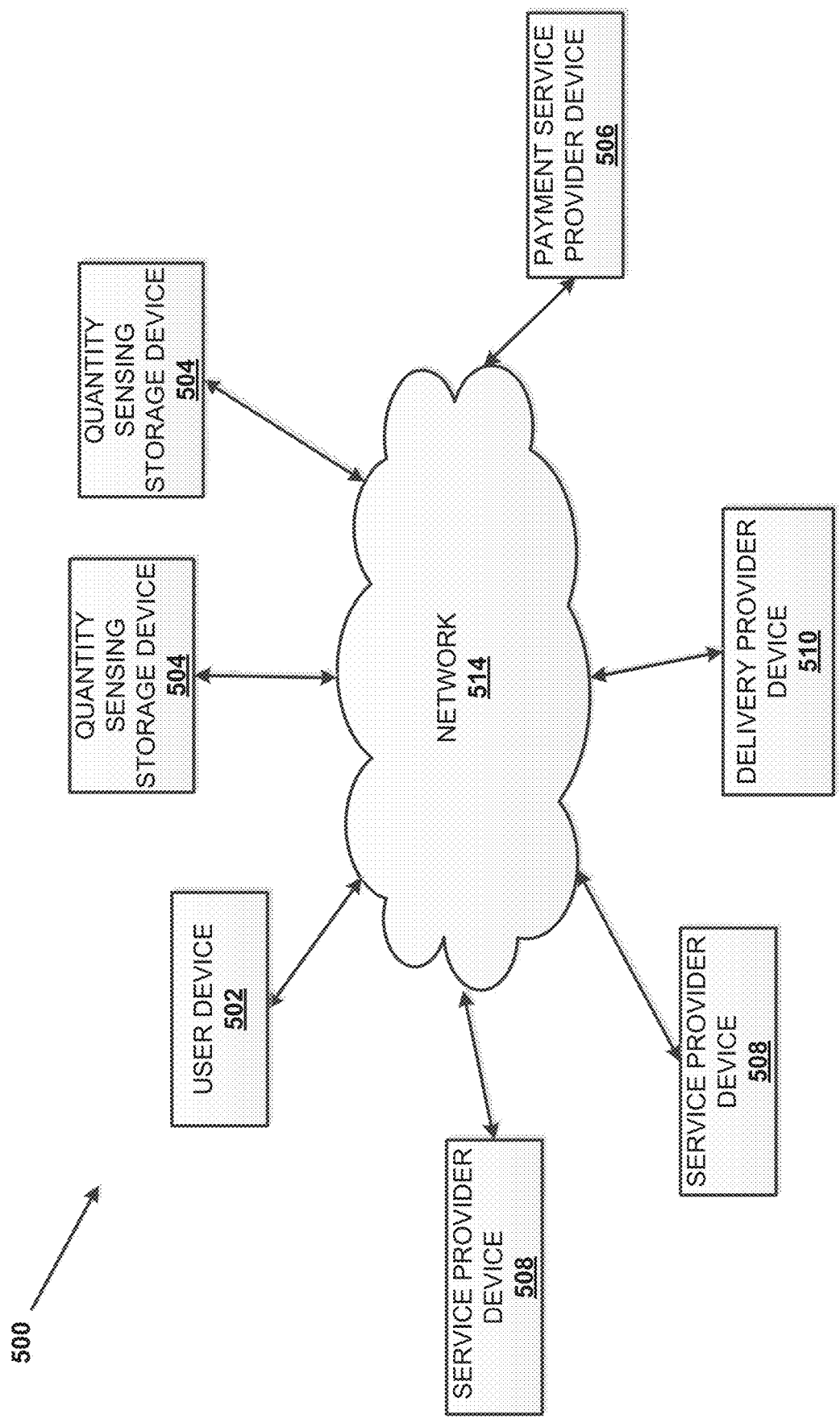
FIG. 5 is a schematic view illustrating an embodiment of a networked system.

Referring now to FIG. 5, an embodiment of a network-based system 500 for implementing one or more processes described herein is illustrated. As shown, network-based system 500 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 5 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked-based system 500 illustrated in FIG. 5 includes a user device 502, a plurality of quantity sensing storage devices 504, a payment service provider device 506, a plurality of service provider devices 508, and a delivery provider device 510 in communication over a network 512. The user device 502 may be the user computing device 302, discussed above. The quantity sensing devices 504 may be any of the quantity sensing storage devices 100 and 304 discussed above and may be operated by the users discussed above. The payment service provider device 506 may be the payment service provider devices discussed above and may be operated by a payment service provider such as, for example, PayPal Inc. of San Jose, Calif. The service provider device 508 may be the service provider device discussed above and may be operated by the service providers discussed above and the delivery provider devices may be the delivery provider devices discussed above.

The user device 502, the quantity sensing storage devices 504, the payment service provider device 506, the service provider devices 508, and the delivery provider device 510 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 500, and/or accessible over the network 512.

The network 512 may be implemented as a single network or a combination of multiple networks. For example, in various embodiments, the network 512 may include the Internet and/or one or more intranets, landline networks, wireless networks, and/or other appropriate types of networks.

The user device 502 may be implemented using any appropriate combination of hardware and/or software configured for wired and/or wireless communication over network 512. For example, in one embodiment, the user device 502 may be implemented as a personal computer of a user in communication with the Internet. In other embodiments, the user device 502 may be a smart phone, personal digital assistant (PDA), laptop computer, and/or other types of computing devices.

The user device 502 may include one or more browser applications which may be used, for example, to provide a convenient interface to permit the payer to browse information available over the network 512. For example, in one embodiment, the browser application may be implemented as a web browser configured to view information available over the Internet.

The user device 502 may also include one or more toolbar applications which may be used, for example, to provide user-side processing for performing desired tasks in response to operations selected by the user. In one embodiment, the toolbar application may display a user interface in connection with the browser application.

The user device 502 may further include other applications as may be desired in particular embodiments to provide desired features to the user device 502. In particular, the other applications may include a payment application for payments assisted by a payment service provider through the payment service provider device 506. The other applications may also include security applications for implementing user-side security features, programmatic user applications for interfacing with appropriate application programming interfaces (APIs) over the network 512, or other types of applications. Email and/or text applications may also be included, which allow the user to send and receive emails and/or text messages through the network 512. The user device 502 includes one or more user and/or device identifiers which may be implemented, for example, as operating system registry entries, cookies associated with the browser application, identifiers associated with hardware of the user device 502, or other appropriate identifiers, such as a phone number. In one embodiment, the user identifier may be used by the quantity sensing storage device 504, the payment service provider device 506, the service provider devices 508 and/or delivery provider device 510 to associate the user with a particular account as further described herein.

The quantity sensing storage device 504 may be maintained, for example, by the user, a conventional or on-line merchant, conventional or digital goods seller, individual seller, and/or application developer offering various products and/or services in exchange for payment to be received conventionally or over the network 512. In this regard, the quantity sensing storage device 504 may include a database identifying available products and/or services (e.g., collectively referred to as product) which may be made available for viewing and purchase by the user.

The quantity sensing storage device 504 may also include a checkout application which may be configured to facilitate the purchase by the user of the products. The checkout application may be configured to accept payment information from the user through the user device 502, from the payment service provider through the payment service provider device 606, and/or from the service provider device 508 over the network 512.

Figure 6:
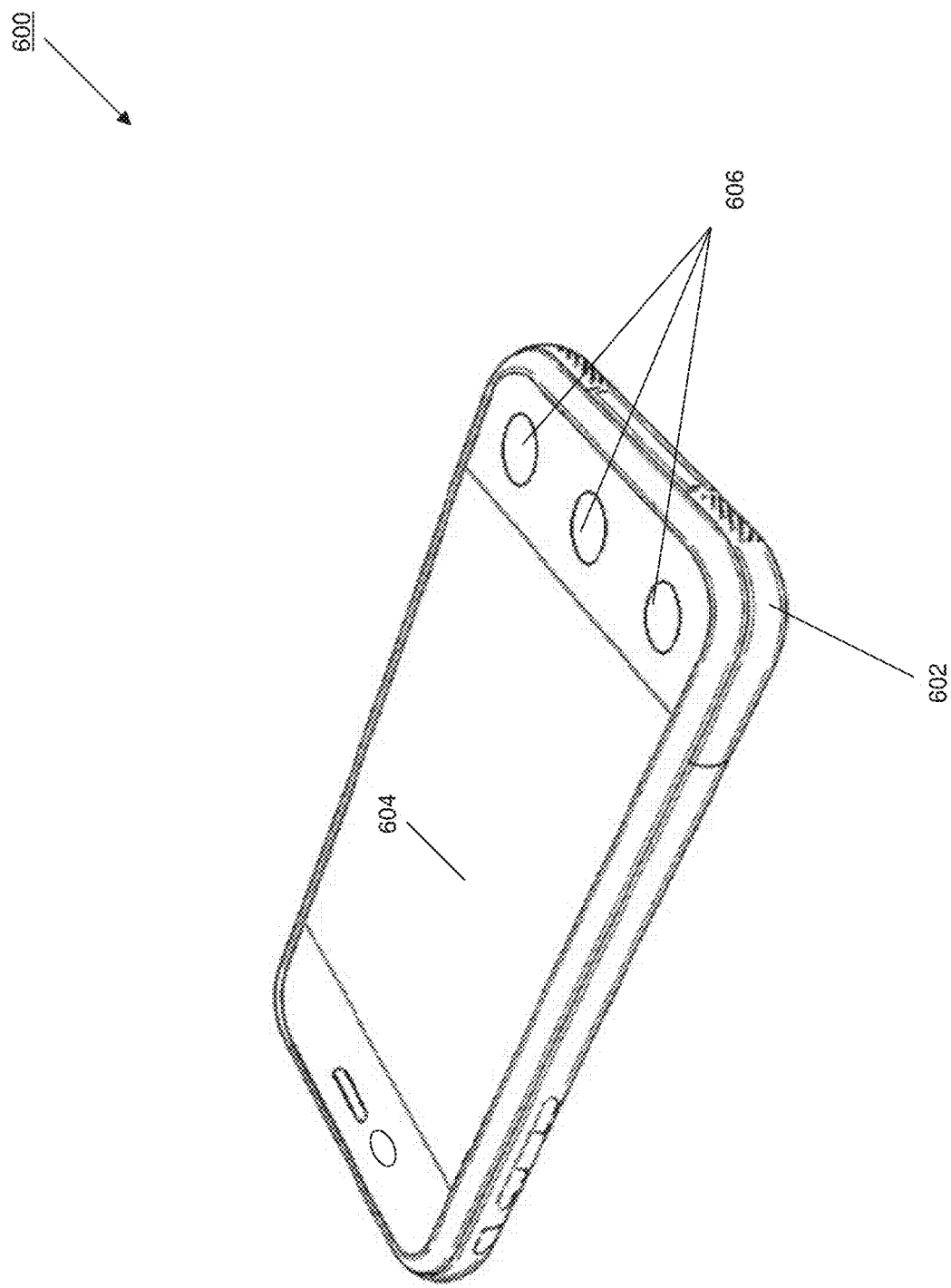
FIG. 6 is a perspective view illustrating an embodiment of a user device.

Referring now to FIG. 6, an embodiment of a user device 600 is illustrated. The user device 600 may be the user computing device 302. The user device 600 includes a chassis 602 having a display 604 and an input device including the display 604 and a plurality of input buttons 606. One of skill in the art will recognize that the user device 600 is a portable or mobile phone including a touch screen input device and a plurality of input buttons that allow the functionality discussed above with reference to the method 200. However, a variety of other portable/mobile payer devices and/or desktop payer devices may be used in the method 200 without departing from the scope of the present disclosure.

Figure 7:
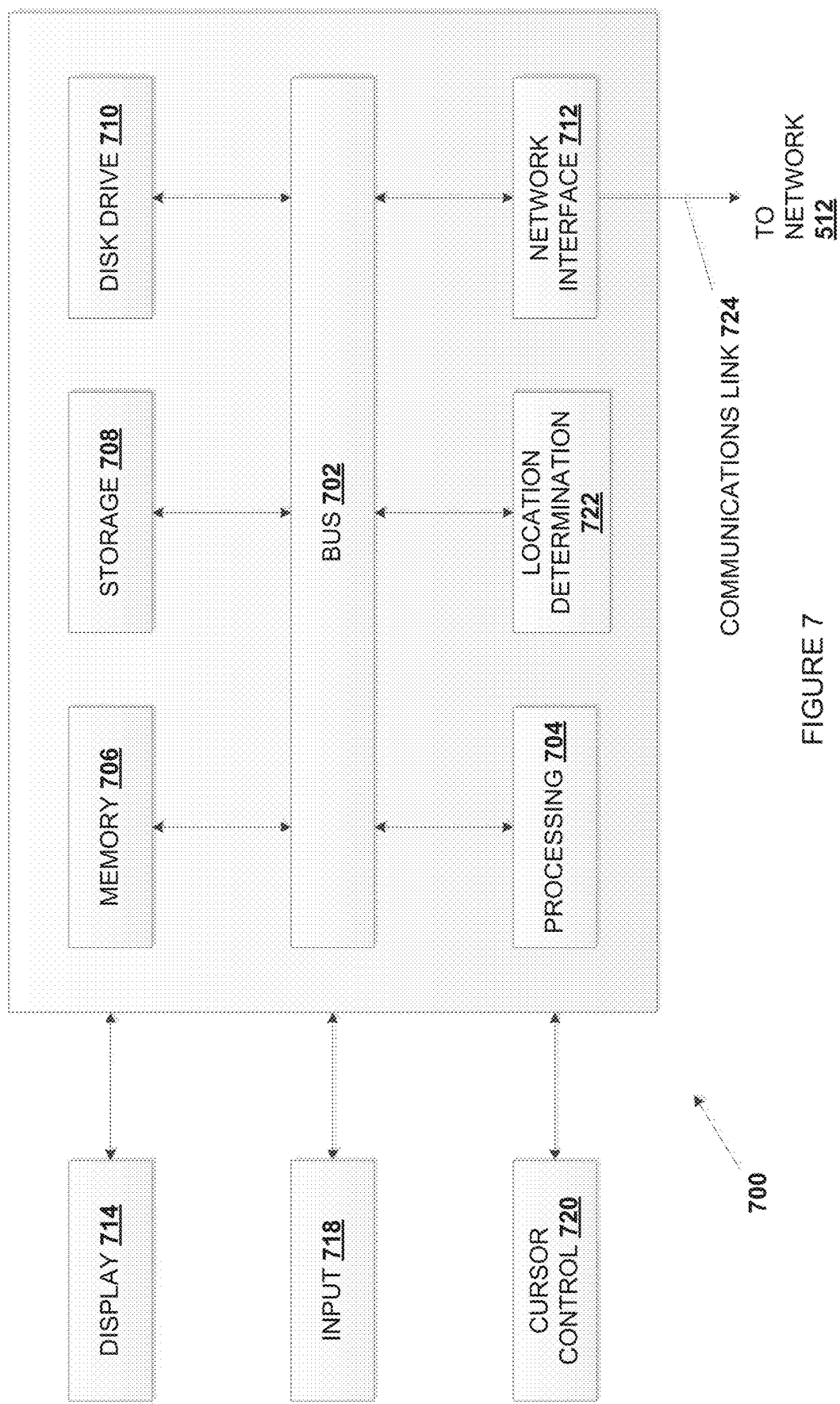
FIG. 7 is a schematic view illustrating an embodiment of a computer system.

Referring now to FIG. 7, an embodiment of a computer system 700 suitable for implementing, for example, the quantity sensing storage devices 100, 304, and 504, the user computing devices 302, 504, and 600, the payment service provider device 506, the service provider device 508 and/or the delivery provider device 510, is illustrated. It should be appreciated that other devices utilized by users, service providers, payment service providers, and delivery providers in the ordering system discussed above may be implemented as the computer system 700 in a manner as follows.

In accordance with various embodiments of the present disclosure, computer system 700, such as a computer and/or a network server, includes a bus 702 or other communication mechanism for communicating information, which interconnects subsystems and components, such as a processing component 704 (e.g., processor, micro-controller, digital signal processor (DSP), etc.), a system memory component 706 (e.g., RAM), a static storage component 708 (e.g., ROM), a disk drive component 710 (e.g., magnetic or optical), a network interface component 712 (e.g., modem or Ethernet card), a display component 714 (e.g., CRT or LCD), an input component 718 (e.g., keyboard, keypad, or virtual keyboard), a cursor control component 720 (e.g., mouse, pointer, or trackball), and/or a location determination component 722 (e.g., a Global Positioning System (GPS) device as illustrated, a cell tower triangulation device, and/or a variety of other location determination devices known in the art.) In one implementation, the disk drive component 710 may comprise a database having one or more disk drive components.

In accordance with embodiments of the present disclosure, the computer system 700 performs specific operations by the processor 704 executing one or more sequences of instructions contained in the memory component 706, such as described herein with respect to the quantity sensing storage devices 100, 304, and 504, the user computing devices 302, 504, and 600, the payment service provider device 506, the service provider device 508 and/or the delivery provider device 510. Such instructions may be read into the system memory component 706 from another computer readable medium, such as the static storage component 708 or the disk drive component 710. In other embodiments, hard-wired circuitry may be used in place of or in combination with software instructions to implement the present disclosure.

Logic may be encoded in a computer readable medium, which may refer to any medium that participates in providing instructions to the processor 704 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 710, volatile media includes dynamic memory, such as the system memory component 706, and transmission media includes coaxial cables, copper wire, and fiber optics, including wires that comprise the bus 702. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 700. In various other embodiments of the present disclosure, a plurality of the computer systems 700 coupled by a communication link 724 to the network 512 (e.g., such as a LAN, WLAN, PTSN, and/or various other wired or wireless networks, including telecommunications, mobile, and cellular phone networks) may perform instruction sequences to practice the present disclosure in coordination with one another.

The computer system 700 may transmit and receive messages, data, information and instructions, including one or more programs (i.e., application code) through the communication link 724 and the network interface component 712. The network interface component 712 may include an antenna, either separate or integrated, to enable transmission and reception via the communication link 724. Received program code may be executed by processor 704 as received and/or stored in disk drive component 710 or some other non-volatile storage component for execution.

The present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on payees and payers; however, a payer or consumer can pay, or otherwise interact with any type of recipient, including charities and individuals. The payment does not have to involve a purchase, but may be a loan, a charitable contribution, a gift, etc. Thus, payee as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A quantity sensing storage device, comprising:
    a chassis;
    a wireless communication subsystem located in the chassis;
    a quantity sensor in communication with the wireless communication subsystem;
    a product database located in the chassis and that stores a product profile;
    a non-transitory memory located in the chassis; and
    one or more hardware processors located in the chassis and coupled to the non-transitory memory, the product database, the quantity sensor, and the wireless communication subsystem and configured to read instructions from the non-transitory memory to cause the quantity sensing storage device to perform operations comprising:
        monitoring, via quantity sensor signals generated by the quantity sensor, a quantity of a first set of a product stored by the chassis;

determining, based on the quantity of the first set of the product, that a first order threshold has been satisfied indicating that a first portion of the first set of the product remains;

automatically providing instruction to a service provider device via the wireless communication subsystem to request an order for a second set of the product in response to determining that the first order threshold has been satisfied;

ceasing monitoring the quantity of the first set of the product for the first order threshold and enabling a refill threshold until the second set of the product has been delivered and the refill threshold has been satisfied;

detecting that a first added quantity of the product has been stored in the chassis;

detecting a depletion of the first added quantity of the product in addition to any remaining quantity of the first portion of the first set of the product that would otherwise satisfy the first order threshold, and in response not providing instruction to order the product to the service provider device until the refill threshold has been satisfied;

detecting that a second added quantity of the product has been stored in the chassis;

determining that the second added quantity of the product in addition to any remaining quantity of the first portion of the first set of the product and the first added quantity of the product satisfies the refill threshold; and monitoring for the first order threshold.

2. The quantity sensing storage device of claim 1, wherein the operations further comprise:

monitoring a rate of change of the quantity of the first set of the product, wherein the determining that the first order threshold has been satisfied is additionally based on the rate of change of the quantity of the first set of the product.

3. The quantity sensing storage device of claim 2, wherein the operations further comprise:

determining the first order threshold based on the product profile associated with a user of the quantity sensing storage device and the product that includes quantity information of that product over time.

4. The quantity sensing storage device of claim 3, wherein the determining the first order threshold is based on a time of delivery of the product that includes a time duration from a first time when the order is placed for the second set of the product to a second time when the second set of the product arrives at a user location.

5. The quantity sensing storage device of claim 1, wherein the operations further comprise:

monitoring a quantity of the first portion of the first set of the product remaining after the order for the second set of the product is processed; and determining, based on the quantity of the first portion of the first set of the product, that a depletion threshold has been satisfied and, in response, adjusting the first order threshold to a second order threshold.

6. The quantity sensing storage device of claim 1, wherein the operations further comprise:

monitoring a quantity of the first portion of the first set of the product remaining after the order for the second set of the product is processed; and determining, based on the quantity of the first portion of the first set of the product, that a remainder threshold has been satisfied indicating a second portion of the first set of the product remains and a duration threshold has been satisfied indicating the second portion of the first set of the product remains for a period of time that is more than a threshold period and, in response, adjusting the first order threshold to a second order threshold.

7. A method for automatically ordering, comprising:

monitoring, by a quantity sensing storage device via quantity sensor signals generated by a quantity sensor included with the quantity sensing storage device, a quantity of a first set of a product stored by the quantity sensing storage device;

determining, based on the quantity of the first set of the product, that a first order threshold has been satisfied indicating that a first portion of the first set of the product remains;

automatically providing instruction to a service provider device to request an order for a second set of the product in response to determining that the first order threshold has been satisfied;

ceasing monitoring the quantity of the first set of the product for the first order threshold and enabling a refill threshold until the second set of the product has been delivered and the refill threshold has been satisfied;

detecting that a first added quantity of the product has been stored in the quantity sensing storage device;

detecting a depletion of the first added quantity of the product in addition to any remaining quantity of the first portion of the first set of the product that would otherwise satisfy the first order threshold that would otherwise satisfy the first order threshold, and in response, not providing instruction to order the product to the service provider device until the refill threshold has been satisfied;

detecting that a second added quantity of the product has been stored in the quantity sensing storage device;

determining that the second added quantity of the product in addition to any remaining quantity of the first portion of the first set of the product and the first added quantity of the product satisfies the refill threshold; and monitoring for the first order threshold.

8. The method of claim 7, further comprising:

monitoring a rate of change of the quantity of the first set of the product, wherein the determining that the first order threshold has been satisfied is additionally based on the rate of change of the quantity of the first set of the product.

9. The method of claim 8, further comprising:

determining the first order threshold based on a product profile associated with a user of the quantity sensing storage device and the product that includes quantity information of that product over time.

10. The method of claim 9, wherein the determining the first order threshold is based on a time of delivery of the product that includes a time duration from the time the order is placed for the second set of the product to the time that the second set of the product arrives at a user location.

11. The method of claim 7, further comprising:

monitoring, by the quantity sensing storage device, a quantity of the first portion of the first set of the product remaining after the order for the second set of the product is processed; and determining, based on the quantity of the first portion of the first set of the product, that a depletion threshold has been satisfied and, in response, adjusting the first order threshold to a second order threshold.

12. The method of claim 7, further comprising:
monitoring, by the quantity sensing storage device, a quantity of the first portion of the first set of the product remaining after the order for the second set of the product is processed; and
determining, based on the quantity of the first portion of the first set of the product, that a duration threshold has been satisfied indicating a second portion of the first set of the product remains for a period of time that is more than a threshold period and, in response, adjusting the first order threshold to a second order threshold.

13. The method of claim 7, further comprising:
determining that the second set of the product has been added to the quantity sensing storage device and, in response, resetting the quantity sensing storage device to monitor for the first order threshold.

14. A non-transitory machine-readable medium having stored thereon machine-readable instructions executable to cause a machine to perform operations comprising:
monitoring, by a quantity sensing storage device via quantity sensor signals generated by a quantity sensor included with the quantity sensing storage device, quantity of a first set of a product stored by the quantity sensing storage device;
determining, by the quantity sensing storage device and based on the quantity of the first set of the product, that a first order threshold has been satisfied indicating that a first portion of the first set of the product remains;
automatically providing, by the quantity sensing storage device, instruction to a product service provider system to request an order for a second set of the product in response to determining that the first order threshold has been satisfied;
ceasing monitoring the quantity of the first set of the product for the first order threshold and enabling a refill threshold until the second set of the product has been delivered and the refill threshold has been satisfied;
detecting that a first added quantity of the product has been stored in the quantity sensing storage device;
detecting a depletion of first added quantity of the product in addition to any remaining quantity of the first portion of the first set of the product that would otherwise satisfy the first order threshold, and in response, not providing instruction to order the product to the product service provider system until the refill threshold has been satisfied;
detecting that a second added quantity of the product has been stored in the quantity sensing storage device;
determining that the second added quantity of the product in addition to any remaining quantity of the first portion of the first set of the product and the first added quantity of the product satisfies the refill threshold; and
monitoring the first order threshold.

15. The non-transitory machine-readable medium of claim 14, wherein the operations further comprise:
monitoring, by the quantity sensing storage device, a rate of change of the quantity of the first set of the product, wherein the determining that the first order threshold has been satisfied is additionally based on the rate of change of the quantity of the first set of the product.

16. The non-transitory machine-readable medium of claim 15, wherein the operations further comprise:
determining, by the quantity sensing storage device, the first order threshold based on a product profile associated with a user of the quantity sensing storage device and the product that includes quantity information of that product over time.

17. The non-transitory machine-readable medium of claim 16, wherein the determining the first order threshold is based on a time of delivery of the product that includes a time duration from the time the order is placed for the second set of the product to the time that the second set of the product arrives at a user location.

18. The non-transitory machine-readable medium of claim 14, wherein the operations further comprise:
monitoring, by the quantity sensing storage device, a quantity of the first portion of the first set of the product remaining after the order for the second set of the product is processed; and
determining, by the quantity sensing storage device and based on the quantity of the first portion of the first set of the product, that a depletion threshold has been satisfied and, in response, adjusting the first order threshold to a second order threshold.

19. The non-transitory machine-readable medium of claim 14, wherein the operations further comprise:
monitoring, by the quantity sensing storage device, a quantity of the first portion of the first set of the product remaining after the order for the second set of the product is processed; and
determining, by the quantity sensing storage device and based on the quantity of the first portion of the first set of the product, that a duration threshold has been satisfied indicating a second portion of the first set of the product remains for a period of time that is more than a threshold period and, in response, adjusting the first order threshold to a second order threshold.

20. The non-transitory machine-readable medium of claim 19, wherein the operations further comprise:
determining, by the quantity sensing storage device, that the second set of the product has been added to the quantity sensing storage device and, in response, resetting the quantity sensing storage device to monitor for the first order threshold.

\* \* \* \* \*